United States Patent
Leemon et al.

(10) Patent No.: US 6,432,236 B1
(45) Date of Patent: Aug. 13, 2002

(54) ULTRASONIC METHOD OF FABRICATING A THERMOSETTING MATRIX FIBER-REINFORCED COMPOSITE STRUCTURE AND THE PRODUCT THEREOF

(75) Inventors: Victor Leemon, Mansfield; Daniel E. Bullock, North Attleboro; Margaret E. Roylance, West Newton, all of MA (US); Jack A. Woods, Kent, WA (US); Joseph S. Boyce, Hanover; John C. Player, Wayland, both of MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 09/691,970

(22) Filed: Oct. 19, 2000

Related U.S. Application Data (63) Continuation-in-part of application No. 08/394,737, filed on Feb. 27, 1995, now abandoned, which is a continuation-in-part of application No. 08/280,303, filed on Jul. 26, 1994, now abandoned, which is a continuation of application No. 08/002,700, filed on Jan. 11, 1993, now abandoned, which is a continuation of application No. 07/662,917, filed on Mar. 1, 1991, now abandoned.

(51) Int. Cl.$^7$ .............................................. B32B 31/16
(52) U.S. Cl. ................. 156/73.1; 156/308.2; 156/580.1
(58) Field of Search ............... 156/73.1, 73.4, 156/73.5, 308.2, 309.6, 324, 580.1, 580.2; 428/113; 264/442, 443, 444

(56) References Cited

U.S. PATENT DOCUMENTS

| | | | |
|---|---|---|---|
| 4,704,172 A | * 11/1987 | Katz | 156/73.2 |
| 4,713,131 A | 12/1987 | Obeda | 156/73.1 |
| 5,039,371 A | 8/1991 | Cremens et al. | 156/382 |

FOREIGN PATENT DOCUMENTS

| | | |
|---|---|---|
| DE | 3911634 | 10/1990 |
| EP | 0007558 | 2/1980 |
| JP | 0004490 | 4/1963 |

OTHER PUBLICATIONS

Branson Sonic Power Corporation, Ultrasonic Plastics Assembly (1979).
Sonic Assisted process Development, Interim Technical Report, "Contract No. F 33615–86C—5041, martin Marietta Baltimore for material Laboratory Air Force Wright labs." (Mar. 1987).
Vijay K. Stokes, Joining Methods for Plastic and Plastic Compoisites: An Overview, GE Corporate Research and Development Schenectady, New York.
T. G. Gutowski, Ultrasonic Welding for Thermoplastic Composites,ANTEC 507–510 (1989).
33rd International SAMPE Symposium, Ultrasonic Welding of Advanced Thermoplastic Composites (Mar. 7–10, 1988).

* cited by examiner

Primary Examiner—James Sells
(74) Attorney, Agent, or Firm—Iandiorio & Teska (57) ABSTRACT

A method of fabricating a thermosetting matrix, fiber reinforced composite structure wherein a stack of fiber reinforced thermosetting material plies are assembled; an ultrasonic horn is engaged with a top surface of the upper most ply, oriented at an acute angle with respect to the top surface, and energized to induce a shear wave in the plies to heat the plies. The horn is moved along the upper most ply to consolidate the plies and the energy level applied to the horn is sufficient to reduce the viscosity of the thermoset resin to the point where the plies can be debulked but not high enough to fully cross-link the resin so that another ply can still be fully cross-linked to the uppermost ply. Pressure is applied to the plies as the horn moves to debulk the plies.

9 Claims, 4 Drawing Sheets

ULTRASONIC METHOD OF FABRICATING A THERMOSETTING MATRIX FIBER-REINFORCED COMPOSITE STRUCTURE AND THE PRODUCT THEREOF

RELATED APPLICATIONS

This application is a continuation-in-part application of U.S. application Ser. No. 08/394,737 filed Feb. 27, 1995, abandoned which is a continuation-in-part of U.S. application Ser. No. 08/280,303 filed Jul. 26, 1994, abandoned which is a continuation of U.S. application Ser. No. 08/002,700 filed Jan. 11, 1993, abandoned which is a continuation of application Ser. No. 07/662,917 filed Mar. 1, 1991 abandoned.

FIELD OF INVENTION

This invention relates to an improved method of ultrasonically consolidating layers or plies of fiber-reinforced thermosetting resin matrix composite materials and more particularly to such a method which applies the ultrasonic energy generally parallel to the surface of the layer to produce substantial shear in the plies to effect heating of the resin matrix. The invention also relates to the product made by that method.

BACKGROUND OF INVENTION

Composite materials are becoming more and more attractive for a wide variety of uses, from aircraft and automobiles to sporting goods and toys, because of their high stiffness and strength-to-weight ratio. One type of composite material includes a combination of fibers or fibrous tows in a matrix of thermosetting resin. Typically, such a composite structure is made of a number of layers of plies of "prepreg" tape. As used herein, a composite material means a structure composed of a plurality of plies of fiber-reinforced fabric or tape in a thermosetting resin matrix. Dry fabric with unidirectional fibers or fibrous tows or woven fibers is often pre-combined with thermosetting resin as a "prepreg". Examples include carbon, glass or graphite fibers in a staged thermosetting resin matrix. The fibers typically comprise more than 35% of the material volume. Thermoset composites generally requires that the fiber/resin plies be laid-up, debulked, and then cured. This process can take a matter of hours. Such composites are to be contrasted with thermoplastic composites which are generally faster to fabricate because there is no curing involved. The thermoplastic plies need only be heated to melt the plastic matrix and then pressed together or consolidated to the other plies before cooling. With thermosetting composites, on the other hand, heating to a high enough temperature invokes an exothermic reaction causing the molecules of the resin to cross link. Once this chemical cross linking occurs, the viscosity of the resin cannot be lowered. This is not the case with thermoplastic type resins.

As used herein, consolidation means laminating two or more plies together to form a part or structure. Good consolidation implies a low level of voids (typically less than 3%) and a shear strength of the ply interfaces after curing which approaches that of the resin matrix.

Filament winding, tape placement and tow placement are common methods for fabricating parts from fiber reinforced composites.

Filament winding involves winding a filament bundle known as a 'tow', to which resin has previously been applied, around a mandrel. Multiple turns around the mandrel are used to build up the required part thickness, after which the part is cured in an oven or autoclave.

During winding, thicker parts may require intermediate consolidation or compaction steps known as 'debulks', using heat in conjunction with pressure and/or vacuum. Thick parts cured without any intermediate debulks often develop fiber wrinkling, which degrades the mechanical properties of the cured part.

In tape or tow placement, a robotic head is used to place a narrow prepreg tow or tape (typically 0.125–2 inches in width) against a tool which defines the desired part shape. Multiple layers are placed at different orientations to obtain the required ply construction and part thickness. A combination of downward pressure on the tow, applied by the head, and tack (stickiness of the tow) is required to insure the tow remains on location after placement, particularly when placing tow on concave portions of the tool.

Usually the tow, and the previously deposited ply layers, are heated to increase the tack prior to placement by the robotic head.

Current tow placement machines use separate mechanisms, placed in close proximity, to apply heat and pressure. Commonly heat is applied by a jet of hot gas directed onto the tow and pressure is applied by one or more rollers or shoes which ride against the surface of the tow. The levels of consolidation achieved in this manner are such that thick tow or tape placed parts also require intermediate debulking to prevent fiber movement or wrinkling during cure.

One obstacle to consistently achieving higher levels of consolidation with these processes is the difficulty inherent in controlling temperature. Because of the heat capacity present in a hot gas system, the temperature of the gas jet, and hence the heat input to the tow, cannot be easily modulated to allow for starts, stops or changes in advance rate of the robotic head.

Intermediate debulking typically involved applying vacuum bag along with associated bag sealants, vacuum lines, connections, etc. to the layup tool or mandrel, and transfer of the tool from the tow placement machine to an oven or autoclave where it is heated to 180–250° F. and held under vacuum pressure for up to four hours. The part is then returned to the tape placement machine to continue the lay-up process. Current thick parts such as the V-22 spindle and the F-22 pivot shaft require numerous intermediate debulks, which adds substantial cost.

A method of applying heat and pressure which achieves high levels of consolidation during tape or tow placement, thus eliminating the need for intermediate debulks, is desired and could result in substantial cost savings. The current invention relates to such method which uses an ultrasonic horn to generate the heat and pressure required for consolidation. Further, the method has the potential, in certain cases, to replace autoclave curing with curing in an oven.

Ultrasonic devices used to heat the plies have appeal for a number of reasons. Unlike convection (hot gas), conduction (hot shoes/irons), or radiation (infrared), ultrasonic consolidation does not depend upon a thermal driver to effect energy transfer to the composite material. Ultrasonic heating is instantaneously modulatable, and it provides deep, penetrating heating in the polymeric matrix beyond mere surface heating.

Ultrasonic welding has long been used to weld or bond neat (unreinforced) plastics with no or little fiber content. Such welding is done by placing an ultrasonic horn perpendicular to two plastic layers, pressing down on the layers and energizing the horn. Obeda, U.S. Pat. No. 4,713,131, teaches joining large sheets of polypropylene plastic by overlapping the sheets of plastic and welding their edges together using an ultrasonic horn placed between the sheets. Obeda, however, teaches nothing about composite materials.

But, others have attempted to use an ultrasonic horn to fabricate composite parts. See *Joining Methods for Plastic and Plastic Composites: An Overview*, Vijay Stokes, *Polymer Engineering and Science*, Mid-October 1989, vol. 29, no. 19, p. 1310–1324, specifically pp. 1322–1324, items 168–236. These previous attempts to weld even thermoplastic composites during the lamination process, using conventional ultrasonic perpendicularly disposed horn welding techniques, have yielded disappointing results because, it is speculated, the presence of the fibers alters the energy transfer in the material. Moreover, these conventional ultrasonic welding techniques set up a compression wavefront in the material which does not transmit well through the material. In 1987, engineers at Martin Marietta attempted to use an ultrasonic horn to consolidate composite thermoplastic resin-fiber plies. The horn was placed on the top of two moving plies to be consolidated in a direction perpendicular to the plies. A range of different pressures, energy levels, and feed rates were tried. The result, however, was not satisfactory: "C-Scan results have shown that attempts to produce consolidated or near-consolidated laminates have not been successful thus far . . . " Sonic *Assisted Process Development*", Interim Technical Report," contract No. F 33615-86-5041, Martin Marietta Baltimore for Material Laboratory Air Force Wright labs., March 1987.

Therefore, although ultrasonic horns have been used to weld plastic sheets together and, to some extent, have been successfully used to weld thermoplastics containing up to about 35% filler (such as glass or talc), the state of the art reveals no successful methodology of fabricating thermosetting or thermoplastic resin fiber matrix composite structures wherein an ultrasonic horn is used to consolidate and debulk the individual fiber-resin plies.

SUMMARY OF INVENTION

It is therefore an object of this invention to provide a method of fabricating a fiber-thermosetting resin matrix composite structure.

It is a further object of this invention to provide such a method which utilizes an ultrasonic horn to consolidate the fiber-resin plies of the composite structure.

It is a further object of this invention to provide such a method which is controllable, instantly modulatable, and which does not require a large thermal differential between the device and the material.

It is a further object of this invention to provide such a method which is much less likely to cause overheating or damage to the material or detract from the consolidation quality.

It is a further object of this invention to provide such a method which heats and applies pressure simultaneously.

It is a further object of this invention to provide such a method which is faster and easier to employ and is less expensive both in execution and in the equipment required, and is extremely energy-efficient.

It is a further object of this invention to provide such a method which eliminates the repeated debulking operations required of the prior art and in which debulking occurs as the plies are laid down.

It is further an object of this invention to provide such a method which can not only debulk as the plies are laid down, but which can also advance the chemical reaction of the resin so that it approaches a condition commonly referred to as the 'gelation point', thus making it possible to final cure parts in an oven instead of in an autoclave.

It is a further object of this invention to reduce or eliminate the repeated debulking operations associated with the prior art.

It is a further object of this invention to provide more control to the debulking process.

It is a further object of this invention to benefit from the fiber "nesting" or settling that occurs due to ultrasonic vibration and thus enhances the ply to ply interlaminar properties.

The invention results from the realization that plies of fiber reinforced thermosetting materials can be debulked and partially or even fully cured by applying ultrasonic energy to the upper most ply in the stack of plies to induce a shear wave in the plies, the shear wave having an energy level sufficient to reduce the viscosity of the thermosetting resin to the point where the plies can be debulked under the application of pressure but not too high an energy level to avoid full chemical cross linking of the resin so that another ply can still be chemically cross linked to the upper most ply.

This invention features a method of fabricating a thermosetting matrix, fiber reinforced composite structure. The method comprises assembling a stack of fiber reinforced thermosetting material plies, engaging an ultrasonic horn with a top surface of the upper most ply; and orienting the horn at an acute angle with respect to the top surface and energizing the horn to induce a shear wave in the plies to heat the plies. Typically, the horn is moved along the upper most ply to consolidate the plies. The energy level applied by the horn is sufficient to reduce the viscosity of the thermoset resin to the point where the plies can be debulked but not high enough to fully cross-link the resin so that another ply can still be fully cross-lined to the uppermost ply. Pressure is applied to the plies via the horn and/or a separate roller or shoe to debulk the plies.

The plies of thermosetting material typically have more than 40% fiber by volume. Final curing may take place in an oven or an autoclave.

This invention also features a thermosetting matrix, fiber-reinforced composite structure made by this novel method.

The method of this invention concerns fabricating a fiber matrix composite structure. A stack of plies of fiber reinforced, thermosetting resin-matrix material are assembled on a mandrel. An ultrasonic horn is engaged with the top surface of the uppermost ply, oriented at an acute angle with respect to the surface, and energized to induce a shear wave in the plies to consolidate and debulk the plies.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
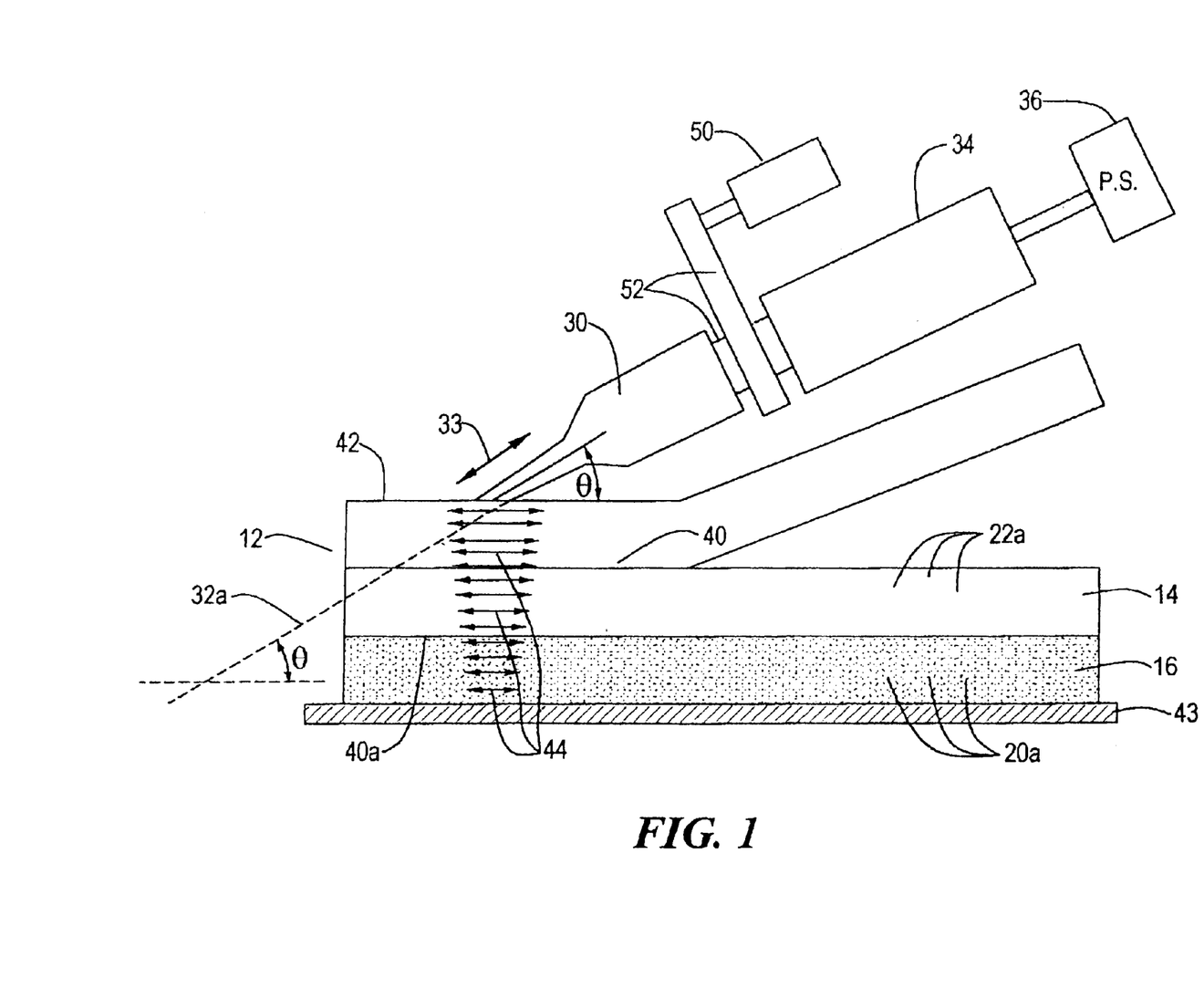
FIG. 1 is a schematic illustration of an ultrasonic method of laminating a fiber-thermosetting resin matrix composite part according to this invention with the consolidation force applied through an ultrasonic horn.

There is shown in FIG. 1 one thermosetting resin matrix, fiber-reinforced composite ply 10 (layer, tow, ribbon, or tape) in the process of being applied to other thermosetting-resin matrix, fiber-reinforced composite plies 14 and 16. Ultrasonic energy is applied to a modified horn 30, which is vibrated in the direction shown by arrow 33 along its longitudinal axis 32 by ultrasonic transducer 34 driven by power supply 36.

In the prior art, the ultrasonic horn 30 was placed perpendicular to plies of thermoplastic materials and the resulting ultrasonic stress waves were generally understood to be compression waves which moved perpendicularly through the plies.

As explained in the Background of the Invention above, this prior art technique, wherein the ultrasonic horn is placed perpendicular to the plies, has met with indifferent success. It is believed this is in part because the fibers in ply 10 affect and dissipate the energy before it can be converted to heat at the interface 40 between ply 10 and ply 14. A horn placed perpendicular to the plies did not result in successful consolidation. See, e.g. the Martin Marietta report cited in the Background of the Invention above.

In accordance with this invention, however, the centerline of ultrasonic horn 30 is disposed at an acute angle θ to the surface 42 of upper most ply 10. Preferably, an angle θ of under 45° is used and surprisingly good results have been obtained with an angle θ of approximately 30°. As opposed to a perpendicularly oriented horn, the angled horn vibrations occur, as indicated by arrow 33, longitudinally, generally parallel to the longitudinal axis of horn 30. But, in this case, the shear waves of vibrations induced in the material, namely plies 10 and 14, are generally parallel with the surface 42 of laminate 12 but also propagate perpendicular to the surface 42. The vibration of horn 30 sets up shear in plies 10 and 14 in a direction generally parallel to surface 42 as indicated by arrows 44. With this orientation, tests have shown that the heating and consolidation are substantially superior to the prior art.

It is important that the horn is in intimate contact with the composite material. The force behind this contact is a controlling variable relating to the successful operation of ultrasonic device. The force should be applied at or near a prescribed location along the ultrasonic device so as not to adversely affect the desired ultrasonic vibrations. The component of the ultrasonic device to which the force is routinely applied may be specially designed and is commonly located between and rigidly attached to the horn and the transducer. This component, conventionally referred to as a booster, is in turn mounted in a force insensitive manner so as to isolate the ultrasonic device from any surrounding fixture(s). Although other ways of applying contact forces are also used, the force may be applied as follows: force application device 50 contacts booster 52. Force application device 50 may be a spring, an electrically driven solenoid or motor driven electromechanical device. Hydraulic and pneumatic actuators have also been used.

The plies 10, 14, and 16 to be consolidated and debulked are generally placed on mandrel 43 as shown. In operation, horn 30 may be drawn along, to the right in FIG. 2, to perform continuous consolidation such as is required in a filament-winding or tape-laying operations in the fabrication of thermosetting composites. In one embodiment, transducer 34 was operated at 40 kHz, although other frequencies may be used. The horn may also be pushed across the top surface of the uppermost ply or the horn held stationary and the stack of plies moved to the left or right in FIG. 2.

Figure 2:
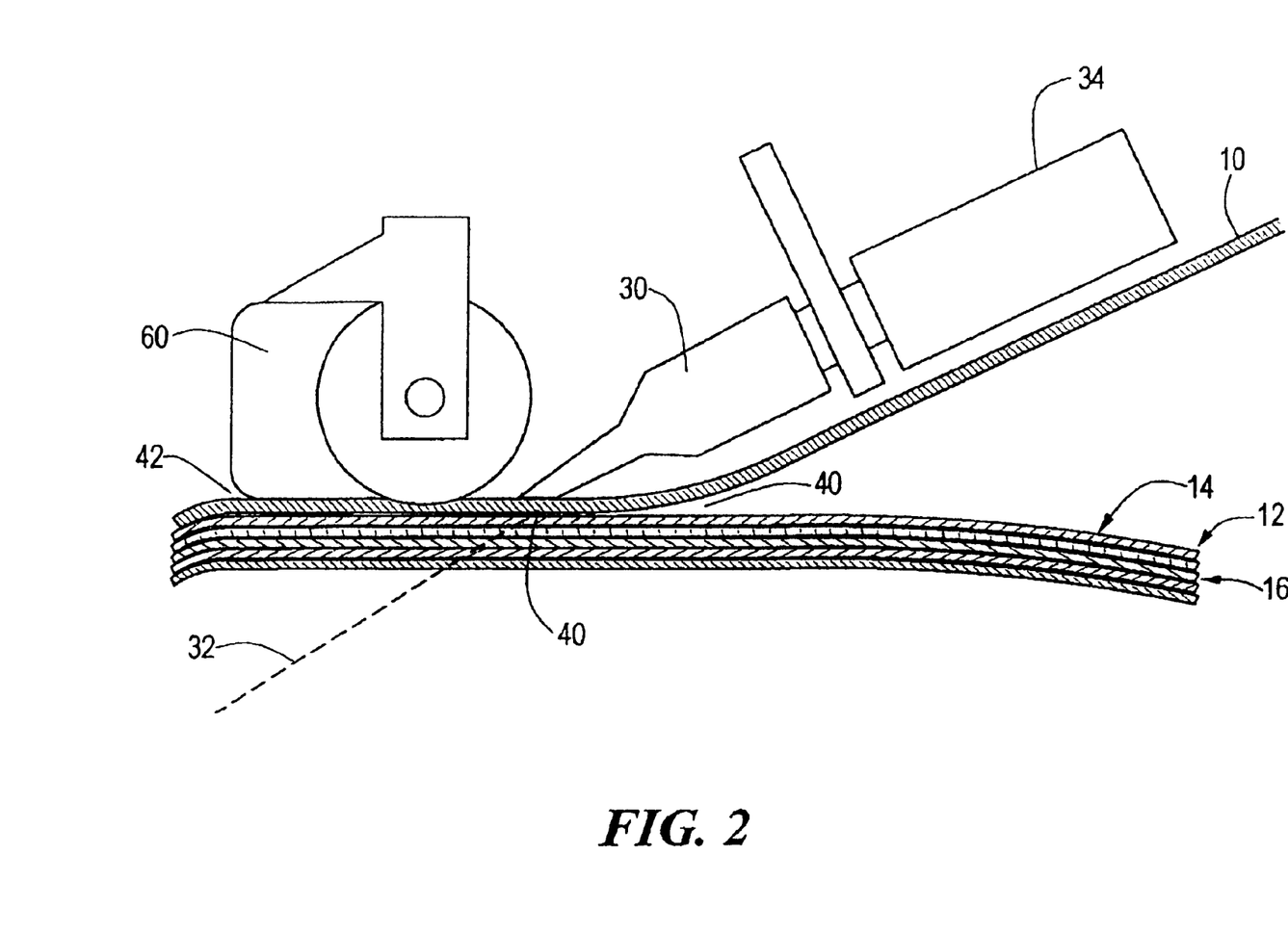
FIG. 2 is a view similar to FIG. 1 with a consolidation force applied by a separate pressure shoe or roller.

The pressure or force required for debulking and consolidation (or to prevent deconsolidation prior to cooling) may also be applied by a separate member, such as a shoe or roller 60, FIG. 2, which is disposed proximate to horn 30. If horn 30 is moving across the surface 42, then shoe 60 extends the period of time when the consolidation force is applied over the situation when the consolidation force is applied only by the horn itself.

The fiber reinforcement direction of each ply may be in the same direction in each ply but typically is not. The fibers may be disposed in an orderly array, they may be random, they may be woven or unidirectional, they may be made of various materials such as glass, carbon, aramid or ceramic substances. The resin matrix is a thermosetting material.

Process optimization trials were conducted using a 40 khz ultrasonic horn and power supply provided by Branson Ultrasonics mounted on an EnTec 2-axis filament winding machine. A support frame was attached to the winder which accommodated the horn, mounting points for pneumatic cylinders which apply pressure on the horn tip, and a steel follower roller.

As delineated in the Background of the Invention above, consolidation of plies of fiber reinforced thermosetting materials in the prior art generally requires forming a lay-up of several plies, using hot gasses to tack the plies together, placing this lay-up in a vacuum bag and then using an oven or autoclave to debulk the plies and to at least partially consolidate the plies. More plies are then added to the lay-up and the autoclave used again to debulk and at least partially consolidate those plies.

The increased temperature induced by the autoclave lowers the viscosity of the thermosetting resin causing flow. The vacuum and increased pressure induced by the autoclave debulks the plies eliminating any voids or entrapped air between plies. The purpose being to insure that the part geometry and thickness are close to the final dimensions (i.e. "near net-shape") when it is eventually placed in the autoclave for final cure, thus preventing occurrence of fiber deformations, wrinkles or waviness in the cured part.

This process, e.g. hot gas placement with intermediate debulking and final autoclave cure, is costly and time consuming. Moreover, autoclaves are expensive and even the largest commercially available autoclave cannot accommodate some composite parts made of fiber reinforced thermosetting materials because of their size and shape.

In the prior art it is desirable for the tape placement process not to advance the resin cure significantly. This is because resin flow is needed later to consolidate the part in the autoclave. However, this ability of the resin to flow under autoclave pressure imposes a requirement for expensive tooling to maintain the desired part geometry during cure. The cost of this expensive tooling can add significantly to the cost of the resultant product particularly for small production runs.

Moreover, the precise temperatures and pressures employed in the autoclave vary from lay-up to lay-up and from part to part, often requiring some experimentation before proper debulking and consolidation is achieved.

In the subject invention, the repeated lay-up and debulking-steps of the prior art methods are eliminated. Instead, the adjacent plies are debulked at least partially or even fully as the plies are laid down. The result is at least partial elimination of the time and cost associated with prior art composite part debulking methods. Further, vibration induced fiber nesting can enhance interlaminar properties. Expensive tooling is sometimes not required to keep the lay-up in its desired shape during the final oven cure. Hot gasses are also generally not required significantly lowering the cost of the resultant part or product.

Additionally, process trials have shown that the ultrasonic head can not only consolidate the plies to near net-shape, it can also advance the cure sufficiently so that the completed lay-up can be cured with minimal tooling in an oven instead of an autoclave using a process known as solid state curing. Expensive tooling is generally not required to keep the lay-up in its desired shape during the final oven cure.

A net-shaped or near net-shaped part and debulking of each ply to adjacent plies is accomplished in accordance with this invention by orienting the ultrasonic horn tip at an angle on the top most ply to be consolidated to the lay-up and energizing the horn to induce a shear wave in the plies which is not dissipated by the fibers in the plies and which heats the thermosetting resin to lower its viscosity via a shear force induced in the plies. The energy level of the shear wave is chosen so that it sufficiently reduces the viscosity of the thermosetting resin to the point where the plies can be debulked by the pressure applied to the stack of the plies via the ultrasonic horn itself and/or a roller which follows the horn as it moves over the plies. The energy level of the shear wave, however, is lower than a level which would cause full chemical cross-linking of the thermosetting resin to therefore allow another ply to be laid down and chemically cross-linked to the ply or plies below it. In this way, the plies are debulked and at least partially consolidated as each ply is laid down reducing or eliminating the need for repeated autoclaving, expensive tooling, and the use of hot gases.

Figure 3:
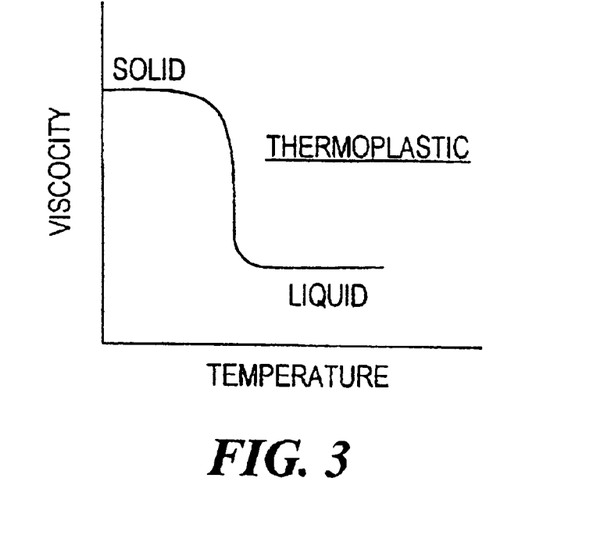
FIG. 3 is a graph showing the relationship between viscosity and temperature for a thermoplastic material.
Figure 4:
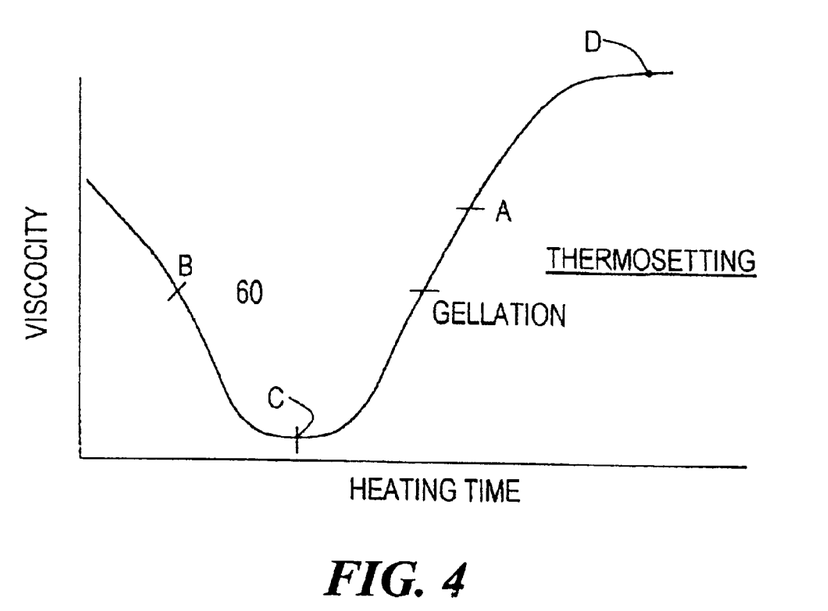
FIG. 4 is a graph showing the relationship between viscosity and temperature for a thermosetting material.

As shown in FIG. 3, cross linking during fluidization is not a concern in thermoplastic composite materials since the thermoplastic matrix undergoes a reversible transition from a solid to a liquid at a predetermined temperature. In thermosetting materials, in contrast, FIG. 4, the viscosity of the resin is dependent on both temperature and time and cannot again be lowered after cross linking of the resin molecules sometime after point A on curve 60. The exothermic reaction is generally understood to begin at about point C. Gellation occurs somewhere near point A. At point D, the resin is fully cured. Debulking is possible between points B and A but as A is approached the ability of the debulked plies to re-flow during subsequent processing steps is inhibited. This can be a problem if the intermediate debulking achieves only partial consolidation and further consolidation is desired during final cure.

Thus, the ultrasonic horn should be energized to a level such that debulking of the plies is possible but not too high such that another ply can still be laid down and its resin cross linked to the thermosetting resin of the ply or plies below. Although the preferred energy level results in a thermosetting resin viscosity between points C and A, it may be desirable to energize the horn at energy levels resulting in viscosity closer to B or closer to A depending on the overall process sequence. For example, if the goal is too eliminate a portion of the intermediate debulks but retain the autoclave for final cure, then a viscosity closer to B, which results in partial consolidation would be sufficient. In contrast, if the goal is to fully consolidate the part and stabilize the geometry to permit solid state curing in an oven, then a viscosity closer to point A is desirable. Depending on the size, configuration, number of plies, and end use of the composite, ultrasonics may be employed simply to reduce the number of intermediate debulks. In other cases, net-shaped fully debulked and consolidated parts suitable for solid state curing in an oven result from the methodology of the subject invention. These different resin states can be achieved by varying the advance rate of the head and the power (vibration amplitude and/or pressure) of the ultrasonic horn. In this way, the invented process provides controlled staging and selected levels of cure advancement.

In one example, one six inch wide, six inch long carbon fiber prepreg tape with unidirectional fibers was laid on a flat mandrel to form the first ply. The centerline of an ultrasonic horn with a one half inch wide beveled tip was oriented at an angle of approximately 30 degrees to the mandrel surface, energized to vibrate at a frequency of 40 mHz, and brought to bear on the tape in multiple parallel passes to cover and debulk the entire surface. Passes of the horn were made in the direction of the fiber tows at a rate of approximately one inch per second. The horn was set at a booster factor of 1:1, 80% amplitude.

Next, another six inch wide, six inch long carbon fiber prepreg tape with unidirectional fibers located 90 degrees from the orientation of the first ply was laid on the first ply to form the second ply in the stack of plies. The ultrasonic horn was again brought to bear at an angle on the tape and moved over the second ply in the direction of the fiber tows to at least partially consolidate the first ply to the second ply and to debulk the lay-up consisting of the two plies. The ultrasonic horn is disposed as shown in FIG. 1.

The energy level applied by the angled horn to the prepreg material was sufficient to reduce the viscosity of the thermosetting resin in each piece of tape of the two plies for at least partial consolidation and debulking but not high enough to cause full chemical cross linking of the resin which would inhibit the ability to lay-up another ply and eventually chemically cross link the resin in that ply to the resin in lower plies in the stack. A roller was configured to closely follow the horn to assist in the debulking process as shown in FIG. 2.

This process was repeated until twenty four plies were laid-up to achieve the desired part thickness, each subsequent ply made of prepreg tape having fiber tows oriented at a right angle to the fiber tows in the ply underneath except in the middle of the resulting composite part where two zero degree plies were consolidated together for mid-plane symmetry of the resulting part.

Two lots of specimens were made in this manner and subsequently one lot was final cured in an autoclave at 100 psi while the other was final cured in an oven. A similar set of specimens was made without ultrasonics and then cured in an autoclave. All three of the resulting lots of composite specimens were 0.130 inches thick.

The short beam shear strength was measured for each of the three specimen lots and the results were as follows:

TABLE 1

| Debulking Method | Resultant Thickness (inches) | Cure Method | Short Beam Shear Strength (psi) | Coefficient of Variation |
|---|---|---|---|---|
| Ultrasonic tape lamination | .130 | Autoclave | 11,700 | 3% |
| Ultrasonic tape lamination | .130 | Oven | 11,200 | 5% |
| Hot vacuum bag | .130 | Autoclave | 10,800 | 10% |

Thus, the ultrasonic tape lamination process of this invention results in high strength fully debulked and cured composite parts made of thermosetting resin, fiber reinforced plies without the use of an autoclave at either the debulking or curing stages. In the prior art, debulking was accomplished with repeated vacuum bag or autoclaving operations and curing was accomplished in an autoclave. In the subject invention, debulking occurs on the fly as the plies are laid down and curing is accomplished by an autoclave, an oven cure, or by the action of the ultrasonic horn as the plies are laid down.

Another experiment was conducted wherein a robotic fiber placement machine which normally employs hot gasses for heating and repeated autoclaving or vacuum bag processing for debulking was modified to include ultrasonic horns disposed at an angle to the laminate surface which debulked the plies of the laminate as they were laid down eliminating the need for repeated debulking operations. The modified robotic fiber placement machine was used to fabricate a composite isogrid panel of the geometry shown in FIG. 5. The isogrid panel was selected for comparison because consolidation of the stiffener intersections 100 (nodes) using hot gas had been problematic. The isogrid panel fabrication demonstrated accurate and precise tow placement to achieve the unidirectional ply buildups that form the stiffener ribs. High levels of consolidation were achieved at the nodes. Thus, the ultrasonic tape lamination process of the subject invention is suitable for large scale manufacturing processes. In the subject invention, the ultrasonic horn was energized only as the plies being laid down approached a node resulting in consolidation at the nodes. Thus, the experiment confirmed the controlled consolidation action achievable by the method of the subject invention in sharp contrast with hot gas prior art methods which are not controllable since the hot gas cannot be turned on and off as rapidly as an ultrasonic horn can be energized and de-energized and hard roller pressure does not provide the good consolidation achievable with a vibratory force.

Figures 5, 6:
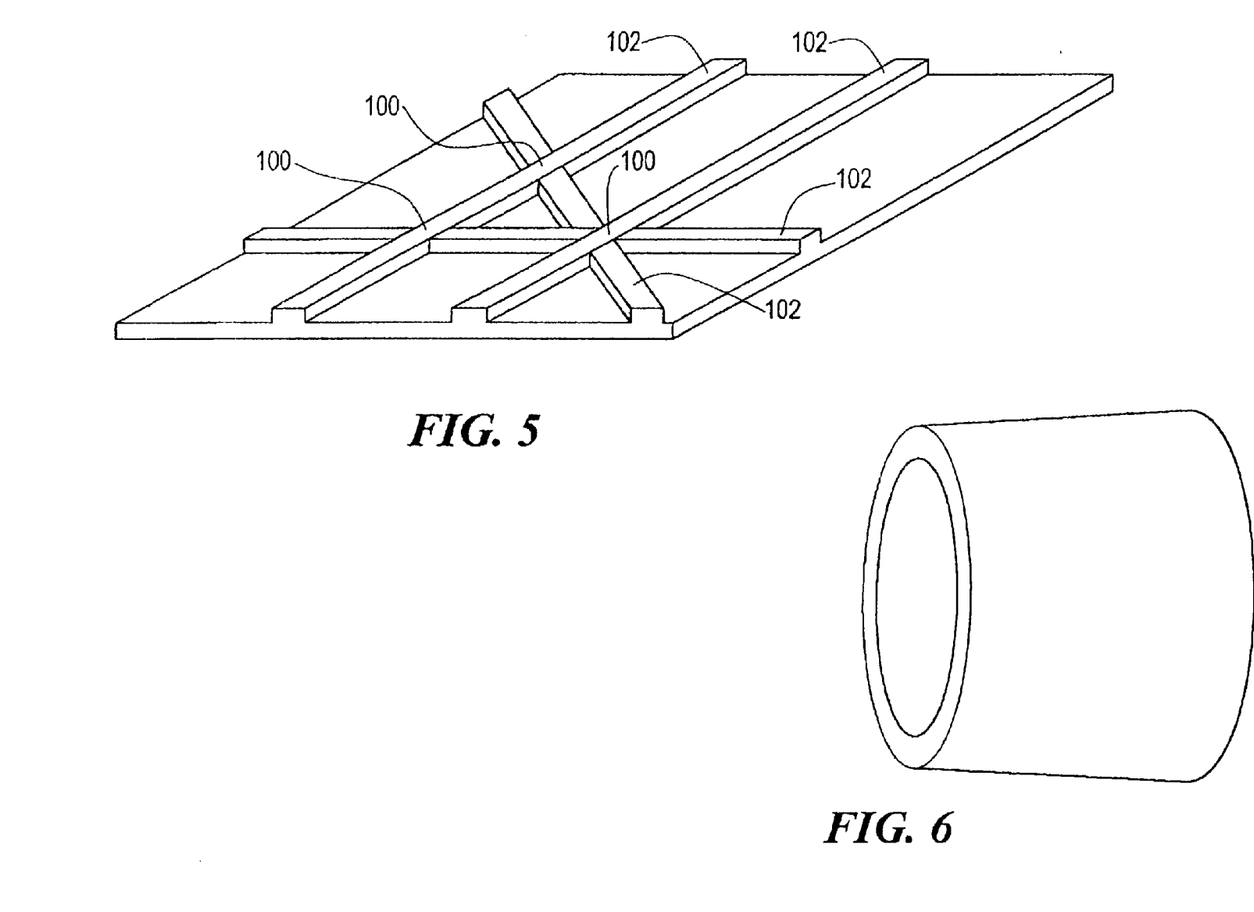
FIG. 5 is a partial schematic view of a composite isogrid component which was fabricated using the invented process.
FIG. 6 is a schematic view of a cylindrical structure fabricated in accordance with the subject invention.

FIG. 6 shows a cylindrical structure manufactured in accordance with the method if the subject invention. Many (70–100) plies were laid down on a mandrel. In the prior art using hot gasses, numerous debulking operations were required using a vacuum bag and an autoclave as the plies were built up. Moreover, after inspection, the ply added after a debulking operation was not entirely consolidated to the previous plies and ply striations were noted.

In contrast, in the subject invention, significantly less debulking operations were required and better consolidation was achieved. Moreover, because of the vibratory action of the ultrasonic horn, the next ply laid down after a debulking operation was fully consolidated to the previous ply and no striations were noted. Instead, the action of the ultrasonic horn causes enhanced fiber nesting between plies.

As stated above, in the subject invention, traditional repeated vacuum bag and oven or autoclave debulking operations are either reduced or eliminated in accordance with the subject invention, striations between debulking operations are reduced or eliminated, and a much higher level of control is possible as the plies are debulked. The final cure can be effected in an autoclave, an oven, or through the use of the ultrasonic horn in accordance with this invention.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A method of fabricating a thermosetting matrix, fiber reinforced composite structure, the method comprising:

assembling a stack of fiber reinforced thermosetting material plies;

engaging an ultrasonic horn with a top surface of the upper most ply;

orienting the horn at an acute angle with respect to the top surface;

energizing the horn to induce a shear wave in the plies to heat the plies; and providing relative motion between the horn and the upper most ply to consolidate the plies, the energy level applied by the horn sufficient to reduce the viscosity of the thermoset resin to the point where the plies can be debulked but not high enough to fully cross-link the resin so that another ply can be cross-linked to the uppermost ply; and applying pressure to the plies as the horn moves to debulk the plies.

2. The method of claim 1 in which the plies of thermosetting material comprises more than 40% fiber by volume.

3. The method of claim 1 further including the step of subjecting the stack of plies to an autoclave or oven cure.

4. The method of claim 1 in which one or more plies is deposited onto a previously assembled and consolidated stack of plies.

5. The method of claim 1 used in conjunction with filament winding, tape placement, fiber placement or tow placement to deposit and consolidate thermosetting matrix, fiber reinforced composites.

6. A method of fabricating a thermosetting matrix, fiber reinforced composite structure, the method comprising:

assembling a stack of fiber reinforced thermosetting material plies, said thermosetting material comprising more than 40% fiber by volume;

engaging an ultrasonic horn with a top surface of the upper most ply;

orienting the horn at an acute angle with respect to the top surface;

energizing the horn to induce a shear wave in the plies to heat the plies;

providing relative motion between the horn and the upper most ply to consolidate the plies, the energy level applied by the horn sufficient to reduce the viscosity of the thermoset resin to the point where the plies can be debulked but not high enough to fully cross-link the resin so that another ply can be cross-linked to the uppermost ply; and applying pressure to the plies as the horn moves to debulk the plies.

7. A method of fabricating a thermosetting matrix, fiber reinforced composite structure, the method comprising:

assembling a stack of fiber reinforced thermosetting material plies;

engaging an ultrasonic horn with a top surface of the upper most ply;

orienting the horn at an acute angle with respect to the top surface;

energizing the horn to induce a shear wave in the plies to heat the plies;

providing relative motion between the horn and the upper most ply to consolidate the plies, the energy level applied by the horn sufficient to reduce the viscosity of the thermoset resin to the point where the plies can be debulked but not high enough to fully cross-link the resin so that another ply can be cross-linked to the uppermost ply;

applying pressure to the plies as the horn moves to debulk the plies; and subjecting the stack of plies to an autoclave or oven cure.

8. A method of fabricating a thermosetting matrix, fiber reinforced composite structure, the method comprising:

assembling a stack of fiber reinforced thermosetting material plies and depositing one or more plies onto a previously assembled and consolidated stack of plies;

engaging an ultrasonic horn with a top surface of the upper most ply;

orienting the horn at an acute angle with respect to the top surface;

energizing the horn to induce a shear wave in the plies to heat the plies;

providing relative motion between the horn and the upper most ply to consolidate the plies, the energy level applied by the horn sufficient to reduce the viscosity of the thermoset resin to the point where the plies can be debulked but not high enough to fully cross-link the resin so that another ply can be cross-linked to the uppermost ply; and applying pressure to the plies as the horn moves to debulk the plies.

9. A method of fabricating a thermosetting matrix, fiber reinforced composite structure, the method comprising:

assembling a stack of fiber reinforced thermosetting material plies using filament winding, tape placement, fiber placement or tow placement;

engaging an ultrasonic horn with a top surface of the upper most ply;

orienting the horn at an acute angle with respect to the top surface;

energizing the horn to induce a shear wave in the plies to heat the plies;

providing relative motion between the horn and the upper most ply to consolidate the plies, the energy level applied by the horn sufficient to reduce the viscosity of the thermoset resin to the point where the plies can be debulked but not high enough to fully cross-link the resin so that another ply can be cross-linked to the uppermost ply; and applying pressure to the plies as the horn moves to debulk the plies.

* * * * *

UNITED STATES PATENT AND TRADEMARK OFFICE
CERTIFICATE OF CORRECTION

PATENT NO.    : 6,432,236 B1                                          Page 1 of 1
DATED         : August 13, 2002
INVENTOR(S)   : Leeman et al.

It is certified that error appears in the above-identified patent and that said Letters Patent is hereby corrected as shown below:

<u>Column 1,</u>
Line 16, insert the following:

-- GOVERNMENT INTEREST
    This invention was made with Government support under Contract No. N00019-96-C-2051 awarded by the Navy. The Government has certain rights in the invention. --

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,432,236 B1                              Page 1 of 1
DATED         : August 13, 2002
INVENTOR(S)   : Victor Leeman et al.

It is certified that error appears in the above-identified patent and that said Letters Patent is hereby corrected as shown below:

Column 6,
Line 7, please change "kHz" to -- mHz --.
Line 25, please change "khz" to -- mHz --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,432,236 B1  Page 1 of 1
DATED : August 13, 2002
INVENTOR(S) : Leeman et al.

It is certified that error appears in the above-identified patent and that said Letters Patent is hereby corrected as shown below:

<u>Column 6,</u>
Line 7, please change "mHz" to -- kHz --.
Line 25, please change "mHz" to -- kHz --.

<u>Column 8,</u>
Line 25, please change "mHz" to -- kHz --.

Signed and Sealed this

Eleventh Day of May, 2004

JON W. DUDAS
*Acting Director of the United States Patent and Trademark Office*